United States Patent
Sokolov et al.

(10) Patent No.: US 10,573,020 B1
(45) Date of Patent: Feb. 25, 2020

(54) LOCATION VALIDATION THROUGH PHYSICAL SURROUNDINGS

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 233 days.

(21) Appl. No.: 15/585,328

(22) Filed: May 3, 2017

(51) Int. Cl.
| | |
|---|---|
| *H04W 4/02* | (2018.01) |
| *G06T 7/70* | (2017.01) |
| *G06K 9/00* | (2006.01) |
| *G06F 16/51* | (2019.01) |
| *G06F 16/58* | (2019.01) |

(52) U.S. Cl.
CPC .............. *G06T 7/70* (2017.01); *G06F 16/51* (2019.01); *G06F 16/5866* (2019.01); *G06K 9/00288* (2013.01); *G06K 9/00906* (2013.01); *H04W 4/02* (2013.01)

(58) Field of Classification Search
CPC ......... H04W 4/00; H04W 4/02; H04W 4/021; H04W 4/023; H04W 4/025; H04W 4/029; H04W 4/04
See application file for complete search history.

(56) References Cited

U.S. PATENT DOCUMENTS

| | | | |
|---|---|---|---|
| 9,742,903 B1 * | 8/2017 | Ferdman ........... | H04M 1/72569 |
| 2009/0003281 A1 * | 1/2009 | Panabaker ........... | H04W 4/02 370/331 |
| 2010/0136511 A1 * | 6/2010 | Garner ............... | G09B 5/00 434/307 R |
| 2012/0194419 A1 * | 8/2012 | Osterhout ........... | G02B 27/0093 345/156 |
| 2013/0100306 A1 * | 4/2013 | Bekiares ........... | G08B 13/19689 348/211.99 |
| 2013/0204415 A1 * | 8/2013 | Fregley ............... | G06Q 30/02 700/94 |

(Continued)

OTHER PUBLICATIONS https://play.google.com/store/apps/details?id=com.lexa.fakegps&hl=en; by Droid Develope; Sep. 8, 2016.

(Continued)

*Primary Examiner* — Jean A Gelin
(74) *Attorney, Agent, or Firm* — Holland & Hart LLP

(57) ABSTRACT

A method for location validation through physical surroundings is described. In one embodiment, the method includes receiving a location of a user device, transmitting to the user device, a request for additional information, receiving the additional information from the user device in response to the request, the second identifier matching the first identifier, comparing the received additional information with stored data pre-associated with the received location, and verifying the received location based at least in part on the comparing. In some embodiments, the request for additional information includes at least one of a request for a first image captured at a first direction, a request for a second image captured at a second direction, a request for a third image captured at a pre-determined tilt angle, a request for a stream of images captured in a pre-determined pattern, or any combination thereof.

20 Claims, 8 Drawing Sheets

(56) References Cited

U.S. PATENT DOCUMENTS

| | | | | |
|---|---|---|---|---|
| 2015/0154851 A1* | 6/2015 | Vincent | ............... | G06F 16/9537 |
| | | | | 340/539.13 |
| 2015/0285527 A1* | 10/2015 | Kim | ......................... | F24F 11/64 |
| | | | | 700/276 |
| 2016/0302030 A1* | 10/2016 | White | ..................... | H04W 4/02 |

OTHER PUBLICATIONS http://www.ibtimes.co.uk/uber-takenride-by-scammer-drivers-earning-profit-bogus-fares-1508601; by Alistair Charlton, Jun. 30, 2015.
https://www.quora.com/How-does-Ingressprevent-cheating-through-spoofed-GPS-and-network-locations; by Richard Goerwitz, Jul. 25, 2016.
http://techwelkin.com/picture-location-google-similar-image-search; by Lalit Kumar, May 29, 2012.

\* cited by examiner

LOCATION VALIDATION THROUGH PHYSICAL SURROUNDINGS

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

As technology in the home, work place, and public areas continues to develop, the ability to secure and protect user information has become more difficult. In particular, certain types of wireless communication are subject to man-in-the-middle (MITM) attacks that may impersonate valid connections with a device, gather and/or receive information relating to the device, and engage in harmful, hostile behavior to steal information. One example of this attack is location validation attacks, that attacks Wi-Fi communications. Users of technology may be unaware of these attacks and as a result may unknowingly divulge secure information to those breaching the system. Thus, there exists needs in the art to develop systems and methods for preventing location spoofing attacks.

SUMMARY

According to at least one embodiment, a method for location validation through physical surroundings is described. In some cases, the present systems and methods may leverage real-time surrounding information to validate location of a user. In one embodiment, the method may include receiving, via one or more processors, a location of a user device, transmitting, via the one or more processors, to the user device, a request for additional information, receiving, via the one or more processors, the additional information from the user device in response to the request, comparing, via the one or more processors, the received additional information with stored data pre-associated with the received location, and verifying, via the one or more processors, the received location based at least in part on the comparing.

In some embodiments, the method may include transmitting, via the one or more processors, a request to capture one or more images of the received location using the user device. In some embodiments, the request for the one or more images includes at least one of a request for a first image captured at a first direction, a request for a second image captured at a second direction, a request for a third image captured at a pre-determined tilt angle, a request for a stream of images captured in a pre-determined pattern, or any combination thereof. In some cases, the first direction is directed towards left of the received location, and the second direction is directed towards right of the received location.

In some embodiments, the pre-determined pattern includes pointing the user device in a certain direction and performing a predetermined movement of the user device in relation to the received location, the predetermined movement comprising at least one of moving the user device around an imaginary rectangle, moving the user device around an imaginary triangle, moving the user device around an imaginary circle, moving the user device around an imaginary polygon, or any combination thereof.

In some embodiments, the method may include receiving via the one or more processors, one or more images of the received location. In some cases, the one or more images may be captured according to the transmitted request.

In some embodiments, the method may include identifying from the received additional information, via the one or more processors, at least one of a light condition at the location and a temperature condition at the location, retrieving via the one or more processors, data associated with at least one of the light condition at the location and the temperature condition at the location. In some cases, the data may be collected by at least one of a local weather station, an airport, a marine report, or any combination thereof, comparing via the one or more processors, at least one of the identified light condition and temperature condition with the retrieved data, and determining via the one or more processors, whether at least one of the identified light condition and temperature condition match with the retrieved data, based at least in part on the comparing.

In some cases, the method may include identifying from the received additional information, via the one or more processors, one or more sounds associated with the location, and determining via the one or more processors, whether the identified one or more sounds are consistent with the received location based on stored sounds pre-associated with the received location.

In some embodiments, the method may include determining via the one or more processors, imagery liveness. In some cases, the imagery liveness may be determined using facial recognition techniques on the received additional information, and verifying via the one or more processors, the received location based at least in part on the determining.

In some embodiments, the method may include determining via the one or more processors, a response time between transmitting the request for additional information and receiving the additional information from the user device, determining via the one or more processors, whether the response time satisfies a threshold, and verifying via the one or more processors, the received location based at least in part on the determining.

In some cases, the location associated with the user device is received in form of a Global Positioning System (GPS) coordinate of the user device, a source Internet Protocol (IP) address of the user device, or any combination thereof.

In some embodiments, the stored data pre-associated with the received location includes at least one of one or more anonymized images of the location with GPS metadata, one or more images of the location stored in external image databases, data generated using physical environment scanning, or any combination thereof.

A computing device configured for location validation through physical surroundings is also described. The computing device may include one or more processors and memory in electronic communication with the one or more processors. The memory may store computer executable instructions that when executed by the one or more processors cause the one or more processors to perform the steps of receiving a location of a user device, transmitting to the user device, a request for additional information, receiving the additional information from the user device in response to the request, comparing the received additional information with stored data pre-associated with the received location, and verifying the received location based at least in part on the comparing.

In some cases, the instructions may further be configured to cause the one or more processors to perform the steps of transmitting a request to capture one or more images of the received location using the user device. In some cases, the request for the one or more images includes at least one of a request for a first image captured at a first direction, a request for a second image captured at a second direction, a request for a third image captured at a pre-determined tilt angle, a request for a stream of images captured in a pre-determined pattern, or any combination thereof.

In some cases, the first direction is directed towards left of the received location, and the second direction is directed towards right of the received location. In some embodiments, the pre-determined pattern includes pointing the user device in a certain direction and performing a predetermined movement of the user device in relation to the received location, the predetermined movement comprising at least one of moving the user device around an imaginary rectangle, moving the user device around an imaginary triangle, moving the user device around an imaginary circle, moving the user device around an imaginary polygon, or any combination thereof.

In some cases, the instructions may further be configured to cause the one or more processors to perform the steps of receiving one or more images of the received location. In some cases, the one or more images may be captured according to the transmitted request.

A non-transitory computer-readable storage medium storing computer executable instructions is also described. When the instructions are executed by one or more processors, the execution of the instructions may cause the one or more processors to perform the steps of receiving a location of a user device, transmitting to the user device, a request for additional information, receiving the additional information from the user device in response to the request, comparing the received additional information with stored data pre-associated with the received location, and verifying the received location based at least in part on the comparing.

In some cases, the instructions may further cause the one or more processors to perform the steps of transmitting a request to capture one or more images of the received location using the user device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
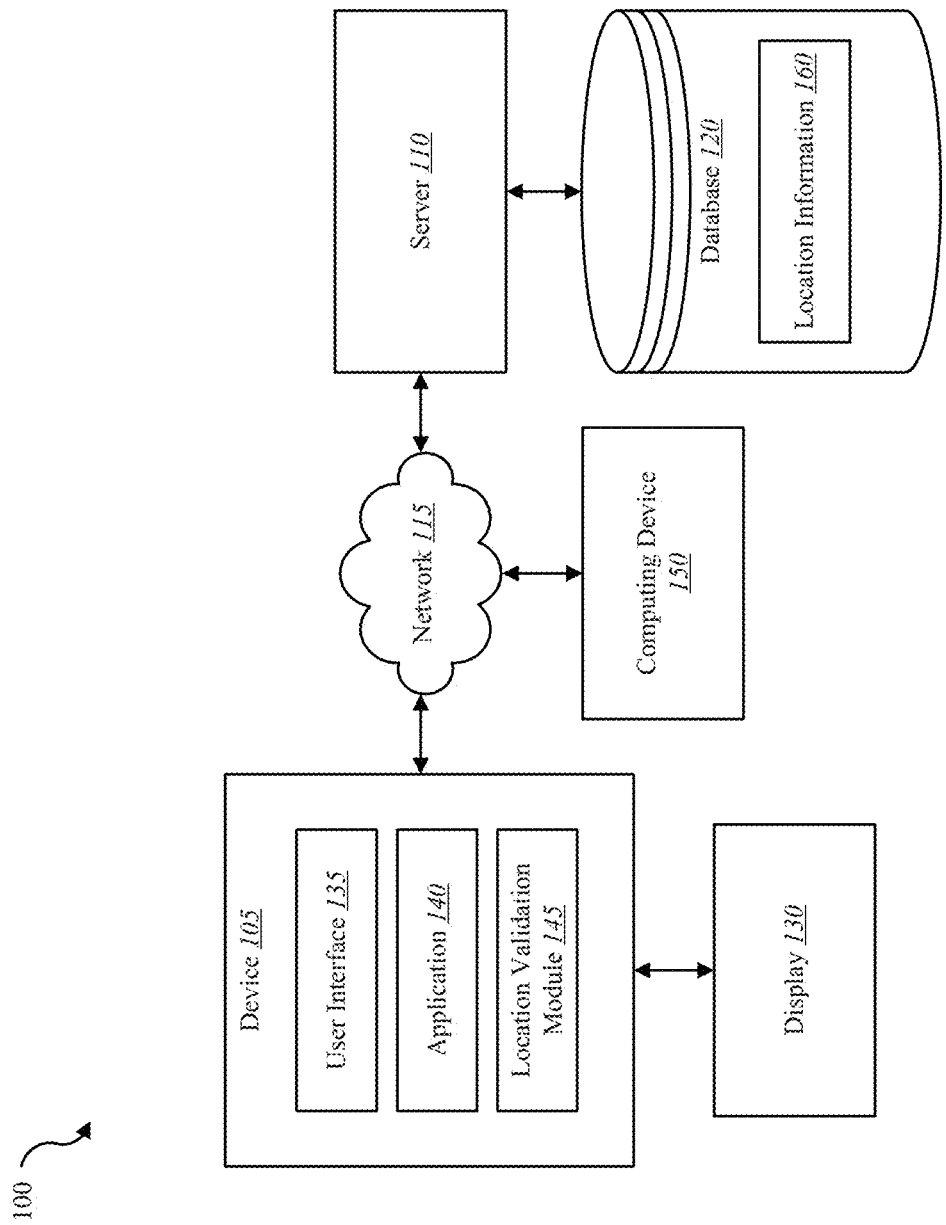
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to validating location of a user device. More specifically, the systems and methods described herein relate to leveraging real-time data relating to physical surroundings to efficiently validate a location.

With the advent of internet, with each passing day, more and more virtual reality applications reflect into the real world. Examples of virtual reality applications may include ordering from restaurants remotely on line, playing massively multiplayer online games (MMOG) that ask us to find prizes in physical world locations, ordering taxi through online taxi services, accessing government benefits from home without visiting government offices, etc. It is essential for most of these applications to know the actual user location (e.g. a location to send a taxi to, a location to deliver goods to etc.) and smart wearables to be capable of identifying it. Currently, smart wearable devices use onboard GPS chip to determine the location. Unfortunately, user position can be easily spoofed, which may lead to actual financial damages when government benefits are claimed by somebody who has no right for them and/or when a legitimate business is tricked into paying for services that were not provided.

Most existing solutions trust clients to provide correct device position (e.g., in a form of GPS coordinate, in for of a source IP address etc.). This solution does not work as intended in high assurance flows when actual physical goods are exchanged (in case of benefits, payments, services). Most existing applications use GPS tracking to validate user is at specified location. However, GPS coordinates can easily be spoofed. Some existing services monitor changes in GPS coordinates, and verify likelihood of the changes happening. For example, Ingress MMOG may monitor speed of user movements and may block suspicious players (i.e., players with an unusually high speed). Another method of location verification is user typical location and address attribute verification. User typical location and address attribute verification is often done as part of identity proofing and electronic id generation. In this method, a user has to provide code mailed (e.g. via a mailing company) to a specific address. However, such verification typically takes several weeks to complete and is not user friendly. A third existing method may be IP geolocation verification. IP address can be spoofed through proxies and Network Address Translator (NAT) controllers. A user may appear to be in the US while actually residing in a different country.

Online image search can identify where a picture was taken by detecting landmarks, street signs and house numbers. However, such technology is not used for verifying physical user location nor does it include liveness detection.

To validate a location of a user's device, the system may use any existing location identification method. As one example, the device may provide GPS coordinates to a system and the system may validate whether the GPS location was spoofed or not. The system may request the user to hold up a camera (camera in the user device) and send the image to the system. The image may be sent as either a sequence of images or as a video stream. The video may be accompanied with other physical surrounding information streams, such as surrounding sounds collected by the microphone, temperature, ambient noise levels collected by wearable sensors etc. All information streams may be combined to form a volumetric location imagery stream. The system may compare the volumetric location imagery stream to other images with known locations (e.g. from anonymized images with GPS metadata from external backup, external image databases, physical environment scanning data available online, etc.). Images with location metadata delivered from multiple independent sources is treated with a higher reputation for verifying the location. Multiple independent sources may be queried to prevent an attacker from uploading several images of a spoofed location. Additionally, the system may perform a series of checks to validate that the image is not being spoofed. The system may request the user to turn left/right/up/down/tilt in relation to the point of view of the camera while capturing the image. In some cases, the system may request the user move the camera in an imaginary shape such as moving the camera in a triangle shape as one example. In some cases, the system may provide an outline of the shape on the screen of a mobile device. In some embodiments, the system may include a direction indicator to indicate to the user which direction to move the camera in relation to the sides of the imaginary shape. In some cases, the system may provide feedback in relation to the movement of the camera relative to the sides of the shape displayed on the screen. In some cases, the feedback may indicate which direction the user is to move the camera relative to the shape displayed on the screen, which side of the shape the user is moving the camera relative to, where the camera is relative to the current side being traced by the relative movement of the camera, a progress that indicates which sides of the shape have been traced, which sides have not been traced, and/or how much of a side remains to be traced, etc.

In some embodiments, the system may use known imagery liveness detection techniques on the captured image. The system may detect whether what is presented is a recording of a recording. In some cases, the system may determine whether light and temperature conditions in the captured image matched with those expected to the location. The system may compare the light and temperature condition data to data collected by local weather stations, airports, and marine reports, to identify whether the image is spoofed. The system may also be configured to identify whether sounds in a captured video changes consistently with the location. The system may calculate response time between commands to turn camera in either direction. The system may determine whether the response time is consistent with direct communication. The system may prevent man-in-the-middle attacks and volumetric imagery replay. If a user is at a location with insufficient surrounding information, the system may ask the user to proceed to the nearest known point (e.g. look out of window, go around the corner etc.) For the purposes of this invention, initial GPS coordinate exchange is not essential. The system may also identify user location by detecting landmarks, street signs and house numbers from user volumetric location imagery.

The present systems and methods receive a location of a user device. For example, location may be received in form of GPS coordinates of the user device. The systems and methods may transmit to the user device, a request for additional information and receive the additional information from the user device in response to the request. The additional information may be received in form of an image, an audio or a video. The systems and methods may compare the received additional information with stored data pre-associated with the received location. For example, the stored data associated with the received location includes at least one of one or more anonymized images of the location with Global Positioning System (GPS) metadata, one or more images of the location stored in external image databases, data generated using physical environment scanning, or any combination thereof. The systems and methods may verify the received location based at least in part on the comparing.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a display 130, a computing device 150, and a network 115 that allows the device 105, the server 110, and the computing device 150 to communicate with one another.

Examples of the device 105 may include any combination of networking devices, mobile devices, smart phones, personal computing devices, computers, laptops, desktops, servers, media content set top boxes, or any combination thereof. Further examples of device 105 may include at least one of a network router, a wired router, a wireless router, network interface controller, wireless network interface controller, a modem, network bridge, network hub, network switch, a multilayer switch, a gateway, a bridge router, a multiplexor, a repeater, a firewall, a proxy server, or any combination thereof.

Examples of computing device 150 may include any combination of a mobile computing device, a laptop, a desktop, a server, a media set top box, or any combination thereof. Examples of server 110 may include at least one of a cloud application server, a remote cloud storage server, a data server, a cloud server, a server associated with an automation service provider, proxy server, mail server, web server, application server, database server, communications server, file server, home server, mobile server, name server, or any combination thereof.

In some configurations, the device 105 may include a user interface 135, application 140, and location validation module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, location validation module 145, and/or server 110. In some cases, application 140 may include a software application such as an online application accessed via a web browser, a cloud based application, a web based application, a mobile application configured to access the Internet, a desktop application configured to access the Internet, or any combination thereof. In some cases, application 140 may be installed on an external device (not shown) connected to the device 150, and may allow a user to interface with a function of device 105, location validation module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a location validation module 145. For example, device 105 may include application 140 that allows device 105 to interface with an external machine via location validation module 145 located on another device such as computing device 150 and/or server 110. In some embodiments, device 105, and server 110 may include a location validation module 145 where at least a portion of the functions of location validation module 145 are performed separately and/or concurrently on device 105, and/or server 110. Likewise, in some embodiments, a user may access the functions of device 105 (directly or through device 105 via location validation module 145) from computing device 150. For example, in some embodiments, computing device 150 includes a mobile application that interfaces with one or more functions of device 105, location validation module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include location information 160. For example, server 110 may identify conjunction with device 105, a information associated with a particular location. Upon identifying the information, server 110 may store the information in location information 160.

Location validation module 145 may enable a computing device to receive a location of a user device, transmit to the user device, a request for additional information, receive the additional information from the user device in response to the request, identify a second identifier of a second packet from the connection associated with the network traffic, compare the received additional information with stored data pre-associated with the received location, and verify the received location based at least in part on the comparing. In some examples, location validation module 145 may transmit a request to capture one or more images of the received location using the user device. In some cases, the request for the one or more images may include at least one of a request for a first image captured at a first direction, a request for a second image captured at a second direction, a request for a third image captured at a pre-determined tilt angle, a request for a stream of images captured in a pre-determined pattern, or any combination thereof. In some embodiments, location validation module 145 may be configured to perform the systems and methods described herein in conjunction with user interface 135 and application 140. User interface 135 may enable a user to interact with, control, and/or program one or more functions of location validation module 145. Further details regarding the location validation module 145 are discussed below.

Figure 2:
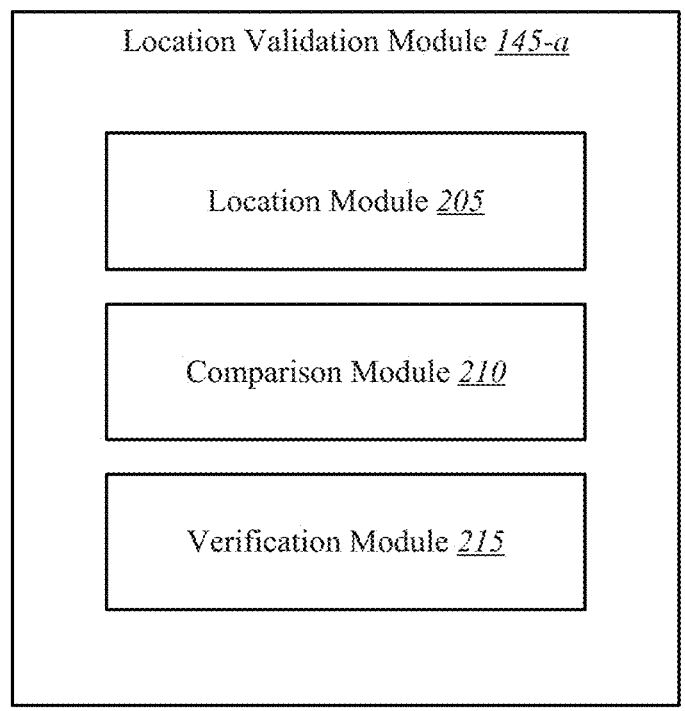
FIG. 2 is a block diagram illustrating one example of a location validation module.

FIG. 2 is a block diagram illustrating one example of a location validation module 145-a. Location validation module 145-a may be one example of location validation module 145 depicted in FIG. 1. As depicted, location validation module 145-a may include location module 205, comparison module 210, and verification module 215.

In some embodiments, at least a portion of location validation module 145 may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, location module 205 may be configured to receive a location of a user device. As one example, location module 205 may receive a location associated with a user device, as part of an application. In some examples, location module 205 may be configured to determine that a user is accessing an application from the user device. As part of the application, the user device may be configured to provide the location. In some examples, location module 205 may receive the location of the user device in form of a GPS coordinate of the user device. In some examples, the location associated with the user device may be received in form of an IP address of the user device.

In some embodiments, location module 205 may be configured to receive the location information over network 115, as described with reference to FIG. 1. In some examples, location module 205 may be configured to identify the location information from at least one of a TCP packet, IP packet, internet control message protocol (ICMP) packet, user datagram protocol (UDP) packet, or any combination thereof. In some cases, location module 205 may identify that the received first packet is a TCP packet. In one embodiment, location module 205 may receive a first location coordinate at a first time, and a second location coordinate at a second time. Location module 205 may be configured to identify a change from the first location coordinate to the second location coordinate. In some examples, location module 205 may be configured to identify whether the change in the location coordinates is feasible. In some cases, location module 205 may identify an user account associated with the user device. As an example, the user account may be associated with an application stored in the user device.

In some cases, location module 205 may transmit to the user device, a request for additional information. In one example, location module 205 may transmit a request for one or more images captured at or near the location. For example, location module may compose a request for additional information, and may transmit the request to the user device. In some embodiments, location module 205 may transmit a request for a video stream captured at the location of the user device. In some embodiments, location module 205 may transmit a request for an audio stream captured at the location of the user device. In some cases, location module 205 may identify a time of the day, and may modify the request based on the time of the day. For example, location module 205 may identify that the time of the day in 9:00 pm. Location module 205 may request for only audio stream, based at least in part on determining that it is dark outside.

In some examples, location module 205 may request the user device for a first image captured at a first direction and a second image captured at a second direction. In response to the request, the user device may transmit the first image and a second image. In some cases, location module 205 may identify one or more structures at or near the location identified from the GPS coordinates of the user device. In some embodiments, location module 205 may request for an image of the identified structure. For example, location module 205 may determine that the GPS coordinates suggest that the user device is currently located in 400 S Main Street, in Salt Lake City downtown. Based on the determination, location module 205 may request an image of the Grand America Hotel, as seen from the location of the user device. Additionally or alternatively, location module 205 may request for an image of the train station, as seen from the user location. In some cases, location module 205 may advise the user to walk a few steps along a certain direction, and then capture an image. For example, in the request, location module 205 may include commands instructing the user to walk a block towards north, and take a picture of a parking lot to the right.

In some embodiments, location module 205 may be configured to receive the additional information from the user device in response to the request. In one example, location module 205 may receive one or more images in response to the request. In some cases, location module 205 may receive an audio file in response to the request. For example, location module 205 may determine that it is dark outside, and may request for an audio clip. In response to the request, location module 205 may receive the audio clip captured at the user location. In some examples, location module 205 may receive a video clip, in response to the request. In some cases, the video clip may include video captured at a particular direction, as directed from the receiver location associated with the user device.

In some embodiments, location module 205 may be configured to identify at least one of a light condition at the location and a temperature condition at the location. In some examples, location module 205 may be configured to identify the light condition and the temperature condition, based at least in part on the received image. For example, location module 205 may receive an image associated with the location of the user device. For example, the image may be captured according to a request of location module 205. In some cases, location module 205 may run image analysis techniques on the received image to determine whether the image is genuine or morphed. In some cases, location module 205 may determine whether an image is downloaded from publicly available sources. In some other embodiments, location module 205 may identify one or more objects from the received image. For example, location module 205 may identify one or more buildings captured in the image. In some cases, location module 205 may analyze the image to determine if the light condition under which the image was captured, matches with the time of the day when the image was captured. In some embodiments, location module 205 may transmit the image analysis data to be stored in database 120, as described with reference to FIG. 1.

In some embodiments, location module 205 may be configured to identify one or more sounds associated with the location. In some examples, location module 205 may be configured to identify the sounds associated with the location, based at least in part on the received audio and/or video file. For example, location module 205 may receive an audio file associated with the location of the user device. For example, the audio file may be captured according to a request of location module 205. In some cases, location module 205 may run analysis techniques on the received audio file to determine whether the sounds recorded in the audio file are consistent with the user location. In some cases, location module 205 may determine whether the audio file is downloaded from publicly available sources. In some other embodiments, location module 205 may identify sounds of one or more objects from the received audio file.

For example, location module 205 may receive a GPS coordinate of the user device, and may identify that the user device is located at a subway station. Location module 205 may request the user to record an audio at the location. In some cases, location module 25 may specify an length of the audio to be recorded. For example, in the request, location module may specify "record an audio for 1 minute at your location." In some cases, location module 205 may analyze the received audio file to determine whether the sounds captured in the audio file, matches with the location of the user device. For example, if the location of the user device suggests that the user device is located at a subway station, location module 205 may determine if the audio file includes sounds typically heard in subway stations (e.g., announcement on speaker, sound of a train, sound of people talking, or any combination thereof). In some embodiments, location module 205 may transmit the audio analysis data to be stored in database 120, as described with reference to FIG. 1.

In some embodiments, location module 205 may be configured to determine an imagery liveness from the received image. In some cases, the imagery liveness may be determined using facial recognition techniques on the received additional information. Upon receiving an image in response to a transmitted request, location module 205 may be configured to run image analysis techniques on the received image. For example, location module 205 may identify faces of one or more individuals captured in the image. In some cases, location module 205 may be configured to determine an imagery liveness from a received video file. For example, in response to a request for additional information, the video file may be transmitted to location module 205, from the user device. In some cases, location module 205 may be configured to utilize the imagery liveness to determine whether the received video was recorded as a live video or whether the received video was recorded from another video.

In some embodiments, location module 205 may determine a response time between transmitting the request for additional information and receiving the additional information from the user device. In some cases, location module 205 may determine whether the response time satisfies a threshold. In some cases, the threshold may be predetermined by location module 205. In some examples, location module 205 may set different thresholds for different time of the day. In some cases, location module 205 may receive a GPS coordinate for the location of a user device. Additionally or alternatively, location module 205 may receive a local positioning system (LPS) coordinate for the location of a user device. Location module 205 may be configured to determine the threshold response time based at least in part on the received GPS coordinate and/or LPS coordinate.

In some embodiments, comparison module 210 may be configured to compare the received additional information with stored data pre-associated with the received location. In some examples, comparison module 210 may retrieve the stored data from one or more publicly available resources. In some cases, the stored data associated with the received location includes at least one of one or more anonymized images of the location with GPS metadata, one or more images of the location stored in external image databases, data generated using physical environment scanning, or any combination thereof. In some examples, comparison module 210 may be configured to retrieve the stored data from location information 160 stored in database 120, as described with reference to FIG. 1.

In some examples, comparison module 210 may receive the additional information from location module 205. In some embodiments, comparison module 210 may be configured to compare the received additional information with stored data pre-associated with the received location. In some examples, comparison module 210 may receive one or more images from location module 205. For example, location module 205 may receive one or more images captured at a user location. Location module 205 may analyze the received image to determine metadata associated with the received image. Location module 205 may send the determined metadata to comparison module 210. In some examples, comparison module 210 may receive the metadata from location module 205, and may use the metadata to determine whether the received image matches one or more stored images pre-associated with the location of the user device.

In some examples, comparison module 210 may receive information relating to a light condition at a location and a temperature condition at the location, from location module 205. In some cases, comparison module 210 may be configured to retrieve data associated with at least one of the light condition at the location and the temperature condition at the location. In some cases, the retrieved data may be collected by at least one of a local weather station, an airport, a marine report, or any combination thereof. In some examples, comparison module 210 may retrieve the stored data from one or more other publicly available resources.

In some embodiments, comparison module 210 may be configured to compare at least one of the identified light condition and temperature condition with the retrieved data. In some examples, comparison module 210 may receive one or more image data, audio data and video data, or any combination thereof, from location module 205. For example, location module 205 may receive one or more images and videos captured at a user location. Location module 205 may analyze the received images and videos to determine the light condition and the temperature condition. Location module 205 may send the determined light condition and temperature condition to comparison module 210.

In some examples, comparison module 210 may receive information relating to one or more sounds associated with a location, from location module 205. In some cases, comparison module 210 may be configured to retrieve data associated with sounds previously recorded at the location. For example, comparison module 210 may determine a time of the day, and may retrieve sounds pertinent to the determined time of the day. In some examples, comparison module 210 may be configured to determine whether the sounds are consistent with the received location based on stored sounds pre-associated with the received location.

In one embodiment, verification module 215 may be configured to verify the received location based at least in part on the comparing. For example, verification module 215 may detect that the GPS coordinates and/or LPS coordinates associated with the location of the user device does not match the additional data related to the location. In some examples, verification module 215 may categorize the location verification as a location spoofing attack.

In some examples, verification module 215 may identify one or more characteristics related to a user associated with the spoofed location spoofing. For example, upon determining that a user is associated with location spoofing, verification module 215 may be configured to tag the user as unreliable. In some examples, verification module 215 may send the tags to location module 205. In some examples, verification module 215 may be configured to track the user. In some examples, verification module 215 may receive the comparison results from comparison module 210.

In some examples, verification module 215 may determine whether at least one of an identified light condition and temperature condition match with retrieved data. In some examples, verification module 215 may be configured to receive comparison results from comparison module 210. Verification module 215 may be configured to verify the user location based at least in part on the comparing. In some embodiments, verification module 215 may receive an indication of a location of the user device, from location module 205. As an example, verification module 215 may receive an indication that the user location is Denver. Comparison module 210 may retrieve current temperature condition in Denver. For example, comparison module 210 may query local weather stations to determine that the current temperature condition in Denver is 32 F and snowing. However, comparison module 210 may determine the temperature condition is sunny in the image of Denver received from the user device. In such examples, verification module 215 may detect that the location of the user device is being spoofed. In some embodiments, verification module 215 may be configured to analyze the packets associated with a connection with the user device, for a predefined time period. As an example, verification module 215 may analyze the packets for a week. In some embodiments, verification module 215 may be configured to identify the user device associated with the spoofed location. In one example, verification module 215 may identify one or more packet flows from device 105 of FIG. 1, one or more packet flows from computing device 150 of FIG. 1, and/or one or more packet flows from server 110 of FIG. 1. Verification module 215 may be configured to use the packet flows to determine a location for the devices (e.g., device 105, computing device 150 and server 110).

Additionally, or alternatively, verification module 215 may be configured to determine a pattern associated with the network traffic. In some examples, verification module 215 may identify a network usage pattern for each user device based at least in part on their IP number. In some examples, verification module 215 may analyze a pattern of traffic between a server and a client. In some examples, verification module 215 identify an origin associated with spoofed location. For example, verification module 215 may identify an IP number associated with the user device associated with the spoofed location.

In some embodiments, verification module 215 may be configured to generate a rating associated with an identified origin. Upon detecting spoofed location associated with a user device, verification module 215 may adjust a rating associated with the origin. In some examples, verification module 215 may be configured to terminate a connection based at least in part on detecting spoofed location. In some examples, verification module 215 may not terminate the established connection, and may monitor for a termination of the connection. In some examples, verification module 215 may store every packet exchanged between a server and the user device, during the connection.

Figure 3:
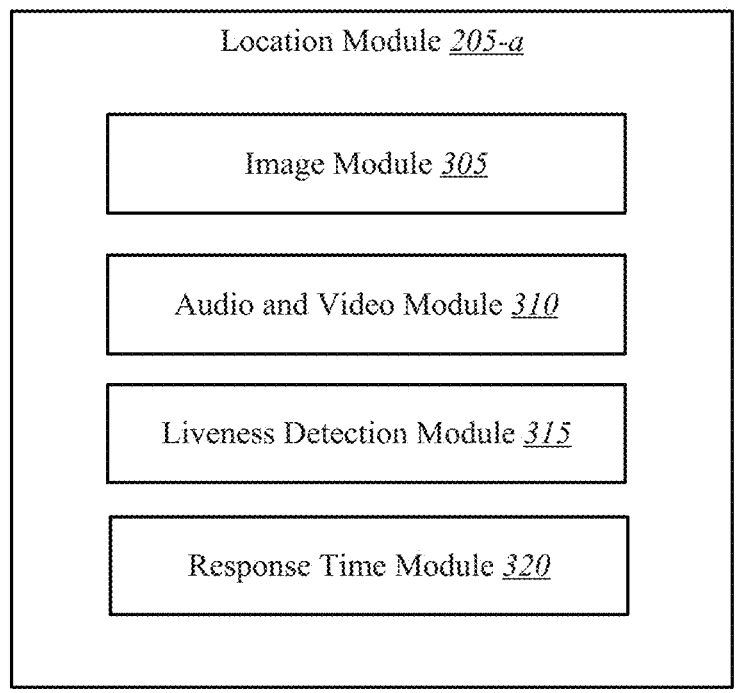
FIG. 3 is a block diagram illustrating one example of a location module.

FIG. 3 is a block diagram illustrating one example of a location module 205-a. The location module 205-a may be an example of location module 205 from FIG. 2. As depicted, location module 205-a may include image module 305, audio and video module 310, liveness detection module 315, and response time module 320.

In some embodiments, at least a portion of location module 205-a may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, image module 305 may be configured to receive a location of a user device. In some examples, image module 305 may receive a location associated with a user device, as part of an application. For example, an application may require access to a location of the user. In some examples, image module 305 may be configured to determine that a user is accessing an application from the user device. As part of the application, the user device may be configured to provide the location. For example, the user device may be configured to share GPS coordinate information with the application. In some examples, the location associated with the user device may be received in form of an IP address of the user device.

In one embodiment, image module 305 may receive a first location coordinate at a first time, and a second location coordinate at a second time. Image module 305 may be configured to identify a change from the first location coordinate to the second location coordinate. In some examples, image module 305 may be configured to identify whether the change in the location coordinates satisfies a threshold. For example, image module 305 may determine that the second time is 2 minutes later than the first time, and the first location is 5 miles apart from the second location. In such cases, image module 305 may determine that the change is location is greater than the threshold. In some examples, the threshold may be pre-determined by image module 305.

In some cases, upon receiving the location of the user device (e.g., in form of a GPS coordinate), image module 305 may transmit to the user device, a request for additional information. In one example, image module 305 may transmit a request for one or more images captured at the location. For example, image module 305 may compose a request for additional information, and may transmit the request to the user device. In some cases, the request may include a request to capture one or more images of the received location using the user device. In some cases, the request for the one or more images may include at least one of a request for a first image captured at a first direction, a request for a second image captured at a second direction, a request for a third image captured at a pre-determined tilt angle, a request for a stream of images captured in a pre-determined pattern, or any combination thereof. In some cases, the request for the one or more images includes at least one of a request for a first image captured while directed towards left of the received location and a request for a second image captured while directed towards right of the received location.

In some cases, image module 305 may identify one or more structures at or near the location associated with the user device. In some embodiments, image module 305 may request for an image of the identified structure. In some examples, image module 305 may request for a stream of images captured in a pattern. In some examples, the pattern may be based on the received location of the user device. In some cases, the pre-determined pattern includes pointing the user device in a certain direction and performing a predetermined movement of the user device in relation to the received location, the predetermined movement comprising at least one of moving the user device around an imaginary rectangle, moving the user device around an imaginary triangle, moving the user device around an imaginary circle, moving the user device around an imaginary polygon, or any combination thereof. As one example, image module 305 may instruct the user to position the camera at arm's length and to move the camera in an imaginary circle at arm's length. Additionally or alternatively, image module 305 may provide on-screen instructions indicating how the user is to move the camera. In some cases, the on-screen instructions may provide on-screen feedback and/or audio feedback as the user moves the camera in the indicated direction. For example, image module 305 may use real-time data acquired from one or more gyroscopes included in the mobile device of the camera and/or real-time data from images being captured by the camera to determine the relative movement of the camera in relation to the indicated shape. In some cases, image module 305 may provide an audio cue such as "move the camera vertically." In some cases, image module 305 may provide an audio cue that indicates a completion of a task relative to tracing the imaginary shape. For example, image module 305 may state "move the camera vertically until the beep is sounded" and then make a beep sound once image module 305 determines that the camera has moved far enough vertically. Image module 305 may then provide another audio cue such as "move the camera to the right until the beep is sounded" etc. In some cases, image module 305 may instruct the user to walk a few steps along a certain direction, and then capture an image. For example, in the request, image module 305 may include commands instructing the user to walk a block towards north, and take a panorama picture of the traffic signal.

In some embodiments, in response to the request, the user device may transmit the first image and a second image. For example, image module 305 may be configured to receive one or more images from the user device. In some cases, the received images may be captured according to the transmitted request. In some examples, image module 305 may be configured to identify at least one of a light condition at the location and a temperature condition at the user location. In some examples, image module 305 may be configured to identify the light condition and the temperature condition, based at least in part on the received image. For example, image module 305 may receive an image associated with the location of the user device. In some cases, image module 305 may determine whether the current time and weather conditions match with the light condition and temperature condition identified from the received image. In some embodiments, image module 305 may run image analysis techniques on the received image to determine whether the image is genuine or morphed. In some examples, image module 305 may identify one or more individuals and/or one or more objects from the received image. For example, image module 305 may identify one or more buildings and one or more people, captured in the image.

In some embodiments, image module 305 may be configured to identify whether the image is sufficient to verify the location associated with the user device. Upon determining that the information determined from the received image is not sufficient to verify the location, image module 305 may instruct the user to proceed to a nearest known location (e.g., around the corner) before capturing the next image. For example, in response to an initial request, image module 35 may receive an image of a living room. Image module 305 may instruct the user to look out of window and capture another image in order to verify the location. In some embodiments, image module 305 may transmit the image analysis data to be stored in database 120, as described with reference to FIG. 1.

In some embodiments, audio and video module 310 may transmit a request for a video stream captured at the location of the user device. In some embodiments, audio and video module 310 may transmit a request for an audio stream captured at the location of the user device. In some cases, audio and video module 310 may identify a time of the day, and may modify the request based on the time of the day. In some examples, audio and video module 310 may transmit the request for a live audio stream. In some cases, the request may be based on the identified location associated with the user device.

In some cases, audio and video module 310 may receive an audio file in response to the request. In some examples, audio and video module 310 may receive a video clip, in response to the request. In some cases, the video clip may include video captured at a particular direction, as directed from the receiver location associated with the user device. In some examples, audio and video module 310 may be configured to receive multiple video clips from the user device. In some cases, audio and video module 310 may be configured to receive multiple audio files from the user device. In some cases, the received audio and video files may be captured according to the transmitted request. In some examples, audio and video module 310 may be configured to identify at least one of a light condition at the location and a temperature condition at the user location, based at least in part on the received video file. For example, audio and video module 310 may receive a video of the location of the user device, and may identify environmental conditions at the location where the video was captured. In some cases, audio and video module 310 may run analysis techniques on the received video file to determine whether the video is consistent with the user location. In some cases, audio and video module 310 may determine whether the video file is downloaded from publicly available sources. In some cases, audio and video module 310 may determine whether the received video file is captured from another video. In some other embodiments, audio and video module 310 may identify sounds of one or more objects from the received video file. In some embodiments, audio and video module 310 may transmit the video analysis data to be stored in database 120, as described with reference to FIG. 1.

In some embodiments, audio and video module 310 may be configured to identify one or more sounds associated with the location. In some examples, audio and video module 310 may be configured to identify the sounds associated with the location, based at least in part on the video file received in response to the request. For example, audio and video module 310 may receive a video file associated with the location of the user device. The video may be captured according to the request transmitted by audio and video module 310. In some cases, audio and video module 310 may run analysis techniques on the received audio file to determine whether the sounds recorded in the audio file are consistent with the user location. In some cases, audio and video module 310 may determine whether the audio file is downloaded from publicly available sources. In some other embodiments, audio and video module 310 may identify sounds of one or more objects from the received audio file.

In some embodiments, audio and video module 310 may be configured to identify whether the audio and/or video is sufficient to verify the location associated with the user device. Upon determining that the information determined from the received audio and/or video is not sufficient, audio and video module 310 may instruct the user to proceed to a nearest known location prior to capturing another image. In some embodiments, audio and video module 310 may transmit the audio analysis data to be stored in database 120, as described with reference to FIG. 1.

In some embodiments, liveness detection module 315 may be configured to determine an imagery liveness from the received image. In some cases, the imagery liveness may be determined using facial recognition techniques on the received additional information. Upon receiving an image and/or a video in response to a transmitted request, liveness detection module 315 may be configured to run image analysis techniques on the received image and video analysis techniques on the received video. For example, liveness detection module 315 may be configured to identify faces of one or more individuals captured in the image and/or video. In some cases liveness detection module 315 may be configured to utilize the imagery liveness to determine whether the received video was recorded as a live video or whether the received video was recorded from another video.

In some embodiments, response time module 320 may determine a response time between transmitting the request for additional information and receiving the additional information from the user device. Response time module 320 calculates the response time to eliminate man-in-the-middle attack. In some cases, response time module 320 may determine whether the response time satisfies a threshold. In some cases, the threshold may be predetermined. In some examples, response time module 320 may set different thresholds based on a context of the received image and/or video. In some cases, response time module 320 may be configured to determine the threshold response time based at least in part on the location of the user device received in form of a GPS coordinate.

Figure 4:
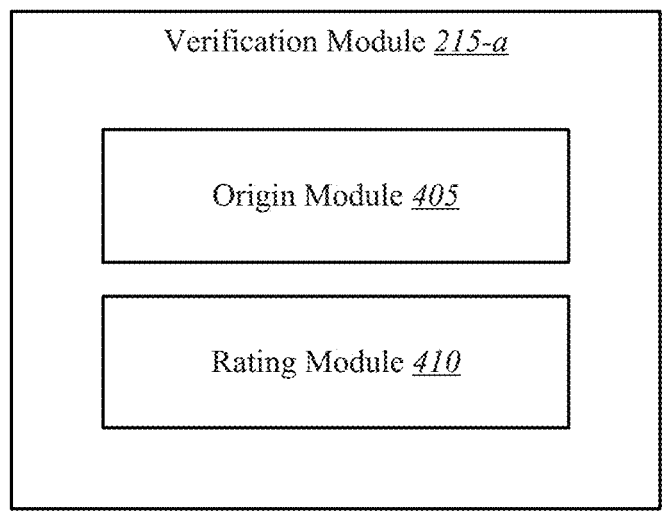
FIG. 4 is a block diagram illustrating one example of a verification module.

FIG. 4 is a block diagram illustrating one example of a verification module 215-*a*. The verification module 215-*a* may be an example of verification module 215 from FIG. 2. As depicted, verification module 215-*a* may include origin module 405, and rating module 410.

In some embodiments, at least a portion of verification module 215-*a* may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, origin module 405 may be configured to verify a location of a user device. In some cases, origin module 405 may verify the location based at least in part on comparing the received image to the determined user location. For example, origin module 405 may detect that the GPS coordinates associated with the location of the user device does not match the additional data related to the location. In some examples, origin module 405 may categorize the location verification as a location spoofing attack. In some embodiments, origin module 405 may identify an origin associated with the spoofed location. For example, origin module 405 may determine a user account associated with the spoofed location. Origin module 405 may monitor an established connection between a user device and a website. In some examples, origin module 405 may determine that a user location has been spoofed. Upon detecting spoofed location, origin module 405 may identify the user device as the origin.

In some embodiments, origin module 405 may be configured to analyze traffic associated with the user account, for a predefined time period. As an example, origin module 405 may analyze the traffic data for a day or a week or a month. In some cases, origin module 405 may identify a category associated with a user device. For example, origin module 405 may determine account information relating to the user device. In some examples, origin module 405 may perform a security action based at least in part on detecting spoofed location.

In some embodiments, rating module 410 may be configured to generate a rating associated with an identified origin. For example, rating module 410 may receive information relating to the origin from origin module 405. In some examples, rating module 410 may receive an indication if location is being spoofed during a connection established by an origin. If spoofed location exists in the connection, then rating module 410 may tag the origin as suspicious origin. In some examples, rating module 410 may adjust a rating associated with the suspicious origin based at least in part on detecting the spoofed location. In some examples, if a rating of a user falls below a certain threshold, then additional verification may be requested at the time of connection establishment.

In some examples, rating module 410 may send the ratings to location module 205. Location module 205 may issue addition requests for location verification for an unreliable connection (i.e., a connection with lower rating). In some embodiments, rating module 410 may tag a user device as reliable or unreliable.

Figure 5:
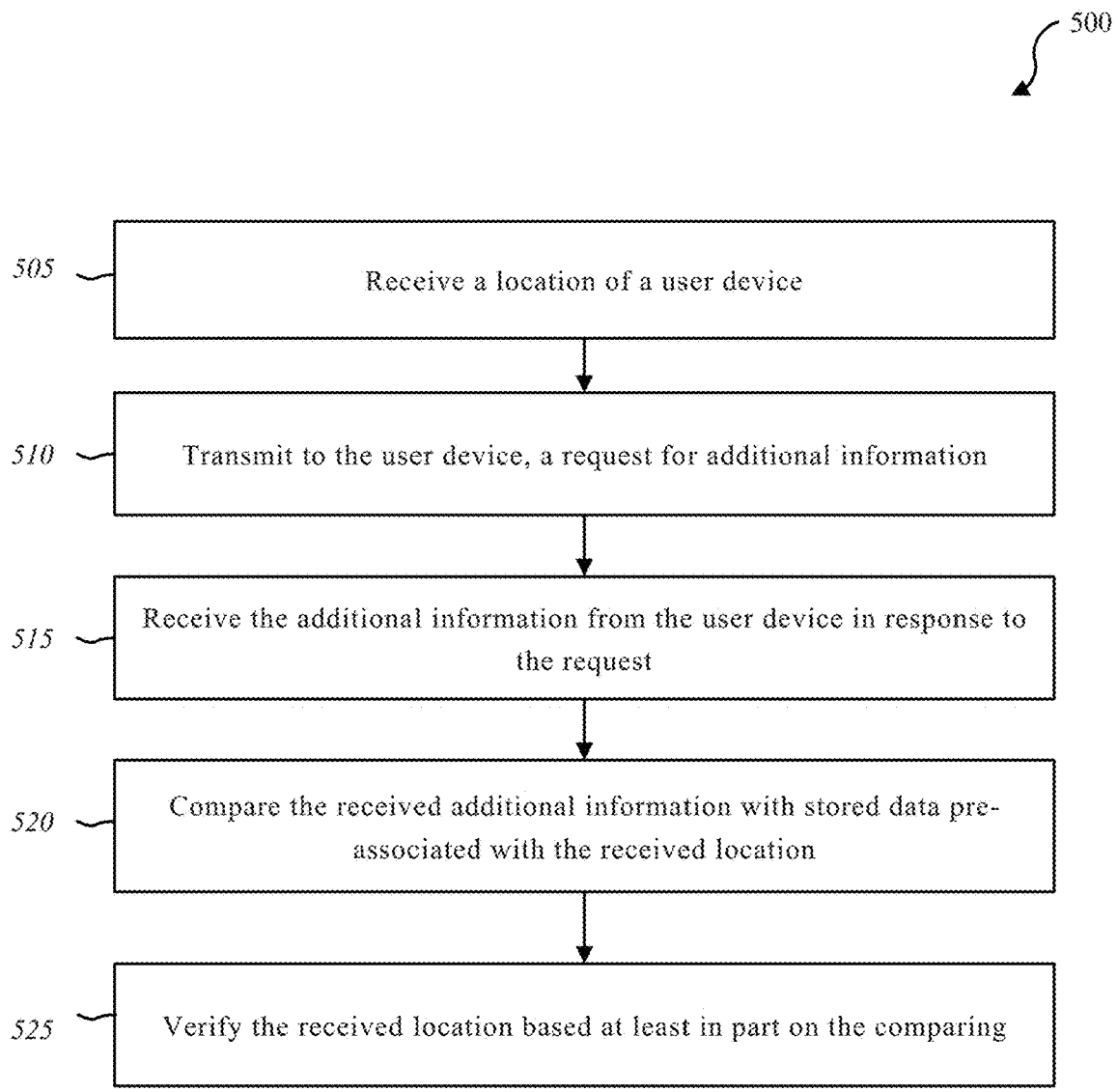
FIG. 5 is a flow diagram illustrating one embodiment of a method in accordance with various aspects of this disclosure.

FIG. 5 is a flow diagram illustrating one embodiment of a method 500 for location validation through physical surroundings. In some configurations, the method 500 may be implemented by the location validation module 145 illustrated in FIGS. 1, 2, 3, and/or 4. In some configurations, the method 500 may be implemented in conjunction with device 105, server 110, network 115, database 120, components thereof, or any combination thereof.

At block 505, method 500 may include receiving a location of a user device. At block 510, method 500 may include transmitting to the user device, a request for additional information. At block 515, method 500 may include receiving the additional information from the user device in response to the request. At block 520, method 500 may include comparing the received additional information with stored data pre-associated with the received location. At block 525, method 500 may include verifying the received location based at least in part on the comparing.

Figure 6:
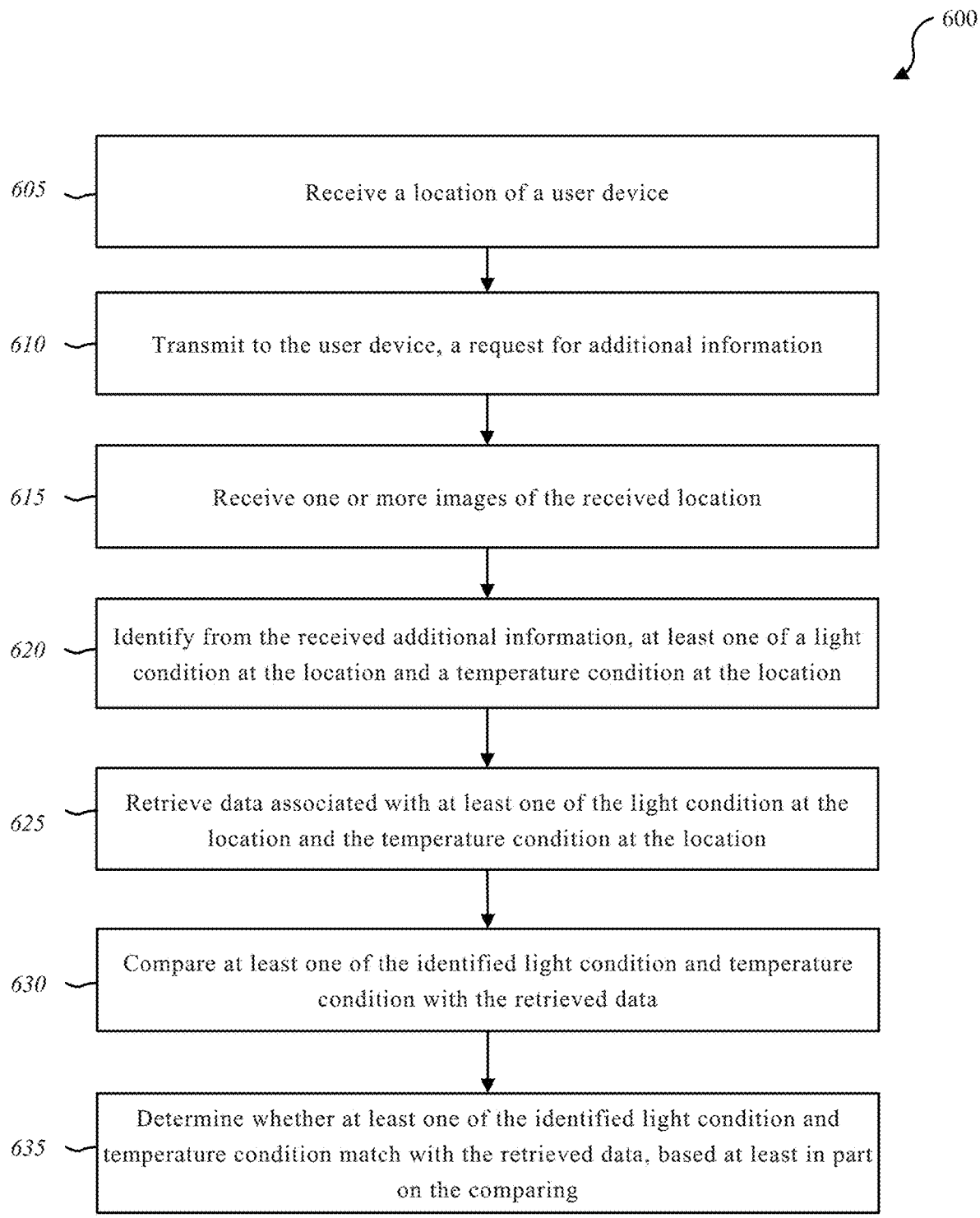
FIG. 6 is a flow diagram illustrating one embodiment of a method in accordance with various aspects of this disclosure.

FIG. 6 is a flow diagram illustrating one embodiment of a method 600 for location validation through physical surroundings. In some configurations, the method 600 may be implemented by the location validation module 145 illustrated in FIGS. 1, 2, 3, and/or 4. In some configurations, the method 600 may be implemented in conjunction with device 105, server 110, network 115, database 120, components thereof, or any combination thereof.

At block 605, method 600 may include receiving a location of a user device. At block 610, method 600 may include transmitting to the user device, a request for additional information. In some cases, the request for the one or more images includes at least one of a request for a first image captured at a first direction, a request for a second image captured at a second direction, a request for a third image captured at a pre-determined tilt angle, a request for a stream of images captured in a pre-determined pattern, or any combination thereof. At block 615, method 600 may include receiving one or more images of the received location. In some cases, the one or more images may be captured according to the transmitted request. At block 620, method 600 may include identifying from the received additional information, at least one of a light condition at the location and a temperature condition at the location. At block 625, method 600 may include retrieving data associated with at least one of the light condition at the location and the temperature condition at the location. At block 630, method 600 may include comparing at least one of the identified light condition and temperature condition with the retrieved data. At block 635, method 600 may include determining whether at least one of the identified light condition and temperature condition match with the retrieved data, based at least in part on the comparing.

Figure 7:
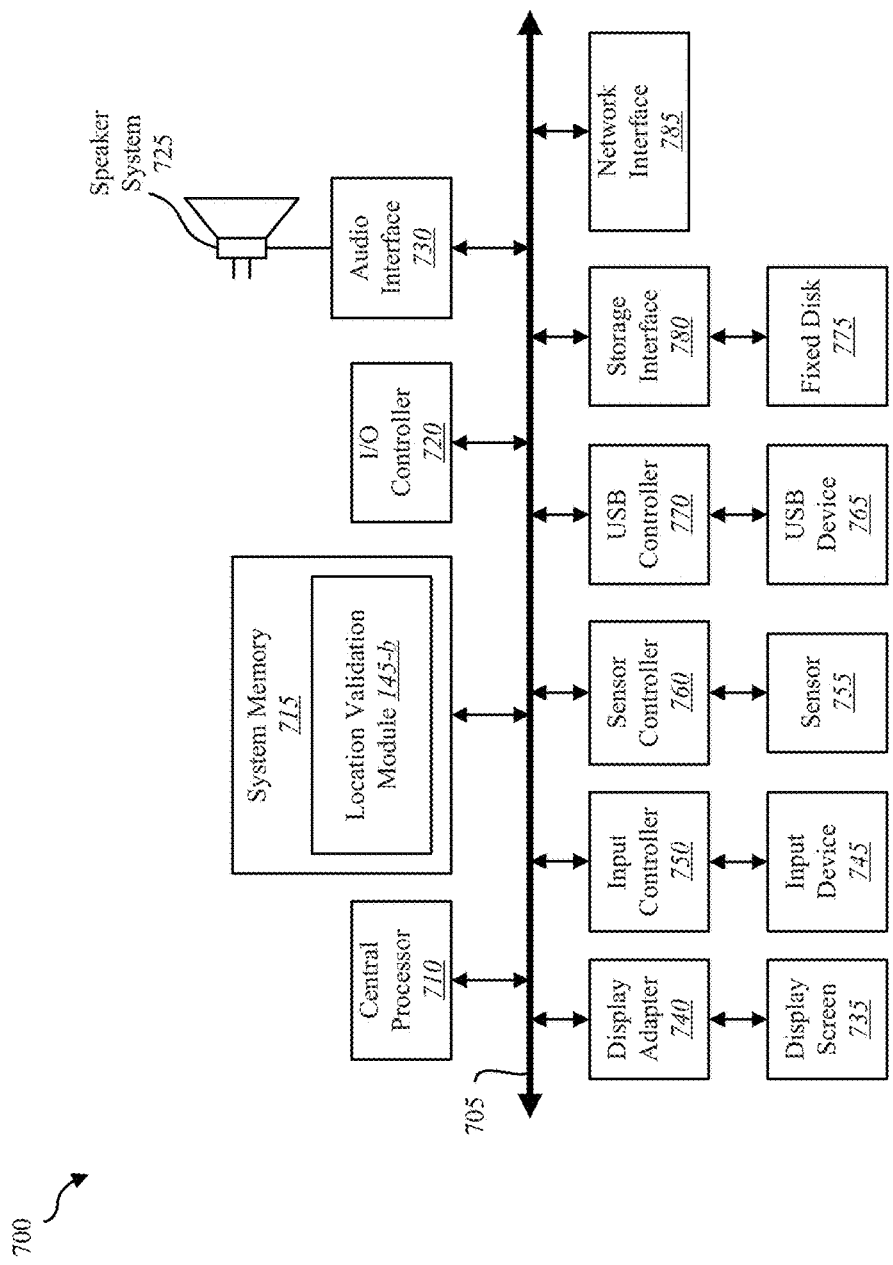
FIG. 7 depicts a block diagram of a computer system suitable for implementing the present systems and methods.

FIG. 7 depicts a block diagram of a computing device 700 suitable for implementing the present systems and methods. The device 700 may be an example of device 105, computing device 150, and/or server 110 illustrated in FIG. 1. In one configuration, device 700 includes a bus 705 which interconnects major subsystems of device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the location validation module 145-*c* to implement the present systems and methods may be stored within the system memory 715. Applications (e.g., application 140) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc The I/O controller 720 may operate in conjunction with network interface 785 and/or storage interface 780. The network interface 785 may enable system 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fiber Channel adapter. Storage interface 780 may enable system 700 to access one or more data storage devices. The one or more data storage devices may include two or more data tiers each. The storage interface 780 may include one or more of an Ethernet adapter, a Fiber Channel adapter, Fiber Channel Protocol (FCP) adapter, a SCSI adapter, and iSCSI protocol adapter.

Figure 8:
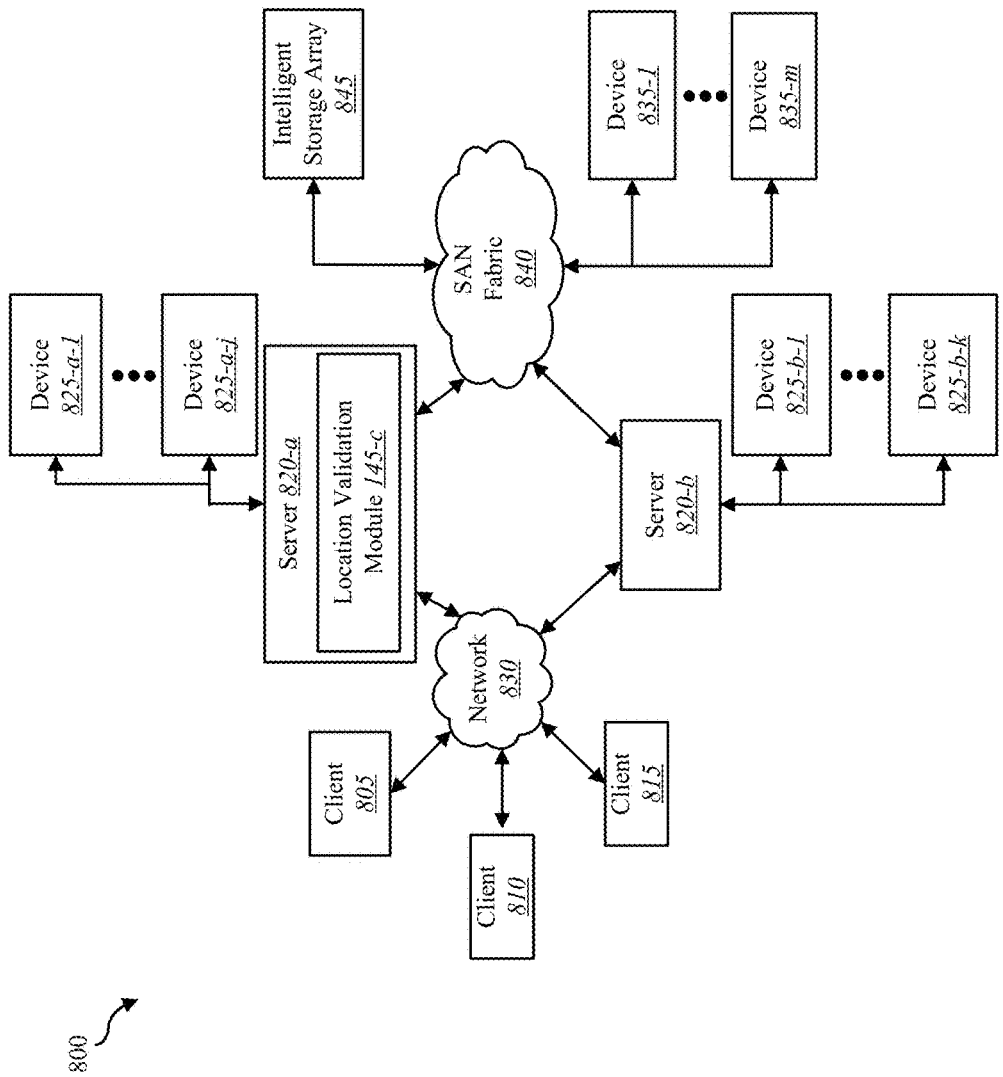
FIG. 8 depicts a block diagram of a computer system suitable for implementing the present systems and methods.

FIG. 8 is a block diagram depicting a network architecture 800 in which client systems 805, 810 and 815, as well as storage servers 820-*a* and 820-*b* (any of which can be implemented using computer system 700), are coupled to a network 830. In one embodiment, location validation module 145-*d* may be located within one of the storage servers 820-*a*, 820-*b* to implement the present systems and methods. Location validation module 145-*d* may be one example of location validation module 145 depicted in FIGS. 1, 2, 3, 4, and/or 7. The storage server 820-*a* is further depicted as having storage devices 825-*a*-1 through 825-*a*-*j* directly attached, and storage server 820-*b* is depicted with storage devices 825-*b*-1 through 825-*b*-*k* directly attached. SAN fabric 840 supports access to storage devices 835-1 through 835-*m* by storage servers 820-*a* and 820-*b*, and so by client systems 805, 810 and 815 via network 830. Intelligent storage array 845 is also shown as an example of a specific storage device accessible via SAN fabric 840.

With reference to computer system 700, network interface 785 or some other method can be used to provide connectivity from each of client computer systems 805, 810 and 815 to network 830. Client systems 805, 810 and 815 are able to access information on storage server 820-*a* or 820-*b* using, for example, a web browser or other client software (not shown). Such a client allows client systems 805, 810 and 815 to access data hosted by storage server 820-*a* or 820-*b* or one of storage devices 825-*a*-1 to 825-*a*-*j*, 825-*b*-1 to 825-*b*-*k*, 835-1 to 835-*m* or intelligent storage array 845. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a device is spoofing location. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method for location validation through physical surroundings, comprising:
   receiving, via one or more processors, a location of a user device;
   transmitting, via the one or more processors, to the user device, a request for additional information;
   receiving, via the one or more processors, the additional information from the user device in response to the request, the additional information including a first stream of information associated with the location of the user device and a second stream of information associated with the location of the user device;
   combining, via the one or more processors, the first stream of information and the second stream of information to generate a combined stream of information;
   identifying from the combined stream of information, via the one or more processors, at least one image associated with the location of the user device and at least one environmental condition associated with the location of the user device;
   comparing, via the one or more processors, the at least one image and the at least one environmental condition with stored data pre-associated with the received location; and
   verifying, via the one or more processors, the received location based at least in part on the comparing.

2. The method of claim 1, wherein transmitting the request for additional information further comprising:
   transmitting, via the one or more processors, a request to capture one or more images of the received location using the user device.

3. The method of claim 2, wherein the request for the one or more images includes at least one of a request for a first image captured at a first direction, a request for a second image captured at a second direction, a request for a third image captured at a pre-determined tilt angle, a request for a stream of images captured in a pre-determined pattern, or any combination thereof.

4. The method of claim 3, wherein the first direction is directed towards left of the received location, and the second direction is directed towards right of the received location.

5. The method of claim 3, wherein the pre-determined pattern includes pointing the user device in a certain direction and performing a predetermined movement of the user device in relation to the received location, the predetermined movement comprising at least one of moving the user device around an imaginary rectangle, moving the user device around an imaginary triangle, moving the user device around an imaginary circle, moving the user device around an imaginary polygon, or any combination thereof.

6. The method of claim 1, wherein receiving the additional information further comprising:
   receiving via the one or more processors, one or more images of the received location, wherein the one or more images are captured according to the transmitted request.

7. The method of claim 1, wherein comparing the received additional information with stored data further comprising:
   identifying from the received additional information, via the one or more processors, at least one of a light condition at the location and a temperature condition at the location;
   retrieving via the one or more processors, data associated with at least one of the light condition at the location and the temperature condition at the location, wherein the data is collected by at least one of a local weather station, an airport, a marine report, or any combination thereof;
   comparing via the one or more processors, at least one of the identified light condition and temperature condition with the retrieved data; and
   determining via the one or more processors, whether at least one of the identified light condition and temperature condition match with the retrieved data, based at least in part on the comparing.

8. The method of claim 1, wherein comparing the received additional information with stored data further comprising:
   identifying from the received additional information, via the one or more processors, one or more sounds associated with the location; and
   determining via the one or more processors, whether the identified one or more sounds are consistent with the received location based on stored sounds pre-associated with the received location.

9. The method of claim 1, comprising:
   determining via the one or more processors, imagery liveness, wherein the imagery liveness is determined using facial recognition techniques on the received additional information; and
   verifying via the one or more processors, the received location based at least in part on the determining.

10. The method of claim 1, comprising:
    determining via the one or more processors, a response time between transmitting the request for additional information and receiving the additional information from the user device;
    determining via the one or more processors, whether the response time satisfies a threshold; and
    verifying via the one or more processors, the received location based at least in part on the determining.

11. The method of claim 1, wherein the location associated with the user device is received in form of a Global Positioning System (GPS) coordinate of the user device, a source Internet Protocol (IP) address of the user device, or any combination thereof.

12. The method of claim 1, wherein the stored data pre-associated with the received location includes at least one of one or more anonymized images of the location with Global Positioning System (GPS) metadata, one or more images of the location stored in external image databases, data generated using physical environment scanning, or any combination thereof.

13. A computing device for location validation through physical surroundings, comprising:
   one or more processors;
   memory in electronic communication with the one or more processors, wherein the memory stores computer executable instructions that when executed by the one or more processors cause the one or more processors to perform the steps of:
   receiving a location of a user device; transmitting to the user device, a request for additional information;
   receiving the additional information from the user device in response to the request, the additional information including a first stream of information associated with the location of the user device and a second stream of information associated with the location of the user device;
   combining, via the one or more processors, the first stream of information and the second stream of information to generate a combined stream of information;
   identifying from the combined stream of information, via the one or more processors, at least one image associated with the location of the user device and at least one environmental condition associated with the location of the user device;
   comparing the at least one image and the at least one environmental condition with stored data pre-associated with the received location; and
   verifying the received location based at least in part on the comparing.

14. The computing device of claim 13, wherein the instructions executed by the one or more processors cause the one or more processors to perform the steps of:
   transmitting a request to capture one or more images of the received location using the user device.

15. The computing device of claim 14, wherein the request for the one or more images includes at least one of a request for a first image captured at a first direction, a request for a second image captured at a second direction, a request for a third image captured at a pre-determined tilt angle, a request for a stream of images captured in a pre-determined pattern, or any combination thereof.

16. The computing device of claim 15, wherein the first direction is directed towards left of the received location, and the second direction is directed towards right of the received location.

17. The computing device of claim 15, wherein the pre-determined pattern includes pointing the user device in a certain direction and performing a predetermined movement of the user device in relation to the received location, the predetermined movement comprising at least one of moving the user device around an imaginary rectangle, moving the user device around an imaginary triangle, moving the user device around an imaginary circle, moving the user device around an imaginary polygon, or any combination thereof.

18. The computing device of claim 13, wherein the instructions executed by the one or more processors cause the one or more processors to perform the steps of:
   receiving one or more images of the received location, wherein the one or more images are captured according to the transmitted request.

19. A non-transitory computer-readable storage medium storing computer executable instructions that when executed by one or more processors cause the one or more processors to perform the steps of:
   receiving a location of a user device;
   transmitting to the user device, a request for additional information;
   receiving the additional information from the user device in response to the request, the additional information including a first stream of information associated with the location of the user device and a second stream of information associated with the location of the user device;
   combining, via the one or more processors, the first stream of information and the second stream of information to generate a combined stream of information;
   identifying from the combined stream of information, via the one or more processors, at least one image associated with the location of the user device and at least one environmental condition associated with the location of the user device;
   comparing the at least one image and the at least one environmental condition with stored data pre-associated with the received location; and
   verifying the received location based at least in part on the comparing.

20. The computer-program product of claim 19, wherein the instructions further cause the one or more processors to perform the steps of: transmit a request to capture one or more images of the received location using the user device.

* * * * *